(12) United States Patent
Flaig

(10) Patent No.: US 10,265,896 B2
(45) Date of Patent: Apr. 23, 2019

(54) METHOD FOR MANUFACTURING A LONGITUDINAL MEMBER CLADDING, AND A LONGITUDINAL MEMBER CLADDING

(71) Applicant: Magna Exteriors GmbH, Sailauf (DE)

(72) Inventor: Joachim Flaig, Koengen (DE)

(73) Assignee: MAGNA Exteriors GmbH, Sailauf (DE)

( * ) Notice: Subject to any disclaimer, the term of this patent is extended or adjusted under 35 U.S.C. 154(b) by 408 days.

(21) Appl. No.: 15/097,510

(22) Filed: Apr. 13, 2016

(65) Prior Publication Data

US 2017/0021538 A1    Jan. 26, 2017

(30) Foreign Application Priority Data

Apr. 16, 2015   (DE) .................. 10 2015 206 902

(51) Int. Cl.
| | | |
|---|---|---|
| *B29C 45/16* | (2006.01) | |
| *B29C 45/14* | (2006.01) | |
| *B29C 45/00* | (2006.01) | |
| *B60Q 1/32* | (2006.01) | |
| *B29L 31/00* | (2006.01) | |
| *B29L 31/30* | (2006.01) | |
| *B29K 23/00* | (2006.01) | |
| *B29K 55/02* | (2006.01) | |

(52) U.S. Cl.
CPC ...... *B29C 45/1671* (2013.01); *B29C 45/0001* (2013.01); *B29C 45/14221* (2013.01); *B60Q 1/323* (2013.01); *B29C 45/14344* (2013.01); *B29C 45/14377* (2013.01); *B29C 2045/14868* (2013.01); *B29K 2023/12* (2013.01); *B29K 2055/02* (2013.01); *B29K 2995/0025* (2013.01); *B29K 2995/0026* (2013.01); *B29L 2031/3005* (2013.01); *B29L 2031/3041* (2013.01); *B29L 2031/747* (2013.01)

(58) Field of Classification Search
CPC .......... B29C 45/1671; B29C 45/14221; B29C 45/0001

See application file for complete search history.

(56) References Cited

U.S. PATENT DOCUMENTS

| | | | | |
|---|---|---|---|---|
| 4,395,817 A | * | 8/1983 | Asada ............... | B29C 45/14311 156/299 |
| 5,641,221 A | | 6/1997 | Schindele et al. | |
| 2012/0237725 A1 | * | 9/2012 | Stossel .................... | B60R 13/02 428/139 |

FOREIGN PATENT DOCUMENTS

| | | |
|---|---|---|
| CN | 102481880 A | 5/2012 |
| CN | 103097100 A | 5/2013 |

(Continued)

OTHER PUBLICATIONS

Office Action for Chinese Patent Application No. 201610203190.6, dated Sep. 15, 2017, 12 pages including 7 pages of English translation.

*Primary Examiner* — Mathieu D Vargot
(74) *Attorney, Agent, or Firm* — Jordan IP Law, LLC; Todd A. Vaughn

(57) ABSTRACT

A longitudinal cladding member for a motor vehicle, a method for manufacturing the longitudinal cladding member, and a motor vehicle having such a longitudinal cladding member. The longitudinal cladding member is to be fixedly connectable to a body of the motor vehicle, and in an assembled state covers a longitudinal member at least on the visible side of the motor vehicle.

8 Claims, 2 Drawing Sheets

(56) References Cited

FOREIGN PATENT DOCUMENTS

| | | | |
|---|---|---|---|
| DE | 202011050956 | U1 | 10/2012 |
| EP | 2556940 | A2 | 2/2013 |
| JP | 2001130321 | A | 5/2001 |
| WO | 2012/001146 | A1 | 1/2012 |

* cited by examiner

METHOD FOR MANUFACTURING A LONGITUDINAL MEMBER CLADDING, AND A LONGITUDINAL MEMBER CLADDING

CROSS-REFERENCE TO RELATED APPLICATIONS

The present application claims priority 35 U.S.C. § 119 to German Patent Publication No. DE 102015206902.8 (filed on Apr. 16, 2015), which is hereby incorporated by reference in its entirety.

TECHNICAL FIELD

Embodiments relate to A longitudinal cladding member for a motor vehicle, a method for manufacturing the longitudinal cladding member, and a motor vehicle having such a longitudinal cladding member. The longitudinal cladding member is to be fixedly connectable to a body of the motor vehicle, and in an assembled state covers a longitudinal member at least on the visible side of the motor vehicle.

BACKGROUND

In longitudinal cladding members of this type, which serve for covering in each case one longitudinal member which laterally extends between the wheel arches of the wings, installation on the body is performed at a plurality of fastening points which in terms of the position of the latter are predefined by bores and other connection elements of body parts.

In order to avoid skewed installation, known longitudinal cladding members are often embodied in multiple parts, the end portions which are separated at the door gap being fastened in a complex manner. Covering of the joints is performed by way of separate cover and decorative strips which are assembled on specifically provided fastening points and which at the peripheries project beyond the wing and the cladding. Besides the absence of integration in terms of shaping, above all the increased complexity in production and assembly is seen as disadvantageous here. German Patent Publication No. DE 19718531 discloses that in each case one joint faceplate which is intended for covering the joint is capable of preliminary assembly at the end portions by way of connection elements and that the end portions together with the pre-assembled joint faceplates are securable to assigned connection points of the body by way of the connection elements.

For modern vehicles the appearance in terms of illumination technology is of steadily growing importance. Here, lighting elements which go beyond the normal lightings such as headlights or rear lights are used. One example here is the surround light which illuminates a region beside the vehicle, allowing the driver to board or disembark the vehicle without concerns. These surround lights are integrated in the wing mirror or else in the door openings, for example.

On account of the surround lights being attached at a comparatively high level above the ground beside the vehicle, the former have to be equipped with strong lighting device.

SUMMARY

In accordance with embodiments, a longitudinal cladding member is provided which is to be fastened in a simple manner and which assumes an illuminating function.

In accordance with embodiments, a method for manufacturing a longitudinal cladding member from plastic material includes at least one of the following: on-demand punching of light-permeable regions from a film; laying up a film in a plastic injection-moulding tool; introducing a die into the position of the punchings; injection-moulding the punched-out region of the film within the die, using a first plastic material; retracting the die; and filling and back injection-moulding the volume around the punchings, using a second plastic material.

In accordance with embodiments, a method for manufacturing a longitudinal cladding member from plastic material includes at least one of the following: on-demand punching of light-permeable regions from a film; arranging the film in a plastic injection-moulding tool; introducing a die into a position of punchings; injection-moulding the punched-out regions of the film within the die, using a first plastic material; retracting the die; and filling and back injection-moulding a volume around the punched-out regions of the film, using a second plastic material.

In accordance with embodiments, a motor vehicle includes at least one of the following: a longitudinal cladding member composed of a plastic material, the longitudinal cladding member having a fastening device to fasten the longitudinal cladding member to the motor vehicle, and light-permeable regions to receive a lighting device.

In accordance with embodiments, a cladding member for a motor vehicle includes at least one of the following: a longitudinal body composed of a plastic material, the longitudinal body having a fastening device to fasten the longitudinal body to the motor vehicle, and light-permeable regions to receive a lighting device.

The advantage of the method in accordance with embodiments lies in the joint-free introduction of plastic materials and, on account thereof, in the good adhesion of the plastic materials combination.

In accordance with embodiments, the method for manufacturing a longitudinal cladding member from plastic material is advantageous in that the first plastic material is dissimilar to the second plastic material. As a result thereof it is possible to process plastic materials having dissimilar characteristics and in this context to connect advantageous material to expensive components. The material properties can thus also be adapted.

In accordance with embodiments, the second plastic material advantageously may comprise Polypropylene (PP) or Acrylonitrile Butadiene Styrene (ABS).

It is advantageous for the first plastic material to be a light-permeable material. Here, the term light-permeable as used in this application may also refer to a particular wavelength range.

In accordance with embodiments, the longitudinal cladding member composed of a plastic material, having a longitudinal extent along a longitudinal vehicle member, has a fastening device, wherein light-permeable regions which are manufactured by a multi-phase injection-moulding method in accordance with the already explained method and a receive lighting device are present in the longitudinal cladding member. On account thereof, illumination effects may be achieved very close to the carriageway, and the lighting device need to have a lower output in order for the surroundings of the vehicle to be radiated.

In accordance with embodiments, it is particularly advantageous that the light-permeable regions are disposed uniformly across the entire length of the longitudinal cladding member. The arrangement, however, in which the light-permeable regions are disposed only in a central portion of the longitudinal cladding member may also be of advantage. Here, only a part-region corresponding to the doors of the vehicle that are opening is lit up.

In accordance with embodiments, it is advantageous that the light-permeable regions are disposed such that the lighting device emit downwards in the direction of the carriageway.

DRAWINGS

Embodiments will be illustrated by way of example in the drawings and explained in the description below.

FIGS. 1(a) to 1(e) illustrate a schematic illustration of the manufacturing method, in accordance with embodiments.

DESCRIPTION

FIGS. 1(a) to 1(e) schematically illustrate the method for manufacturing a longitudinal cladding member. A plastic injection-moulding tool 6 is illustrated schematically in FIG. 1(a). In order for the illustration to the simplified, no periphery of the lower tool and also no upper part of the tool are depicted here. However, it is evident that a cavity, that is to say a hollow space to be filled, must be available for manufacturing the longitudinal cladding member. The surfaces of these components must have properties in terms of external appearance and also in terms of impact resistance and weather resistance, these properties being expected by customers and met by way of complex painting methods, for example. In order for these time and cost consuming methods to be avoided, films which, post back moulding, form the surface of the finished component are employed. Typically, these films are initially moulded in a thermo-tool and subsequently post cooling are back injection-moulded, using back-moulding materials, typically duroplastic or thermoplastic materials.

In a first variant of the method, clearances 4 are introduced into a film 7 already outside the injection-moulding tool 6, and the cut-out material is removed.

The film 7 is arranged or otherwise positioned on the tool 6 or is arranged in a clearance of the tool 6, respectively. In accordance with embodiments, although the film 7 is arranged in a planar manner and is not pre-moulded in the illustration, this however, does not correspond to the reality in the manufacture of a longitudinal member. That is to say, that another method step, i.e., thermoforming of the film 7 in the tool 6, would have to be provided here.

The film 7 is composed of an extruded material which is employable for an external application on a vehicle. This step is eliminated if the film 7 prior to back injection-moulding is pre-moulded and painted.

Figure 1:
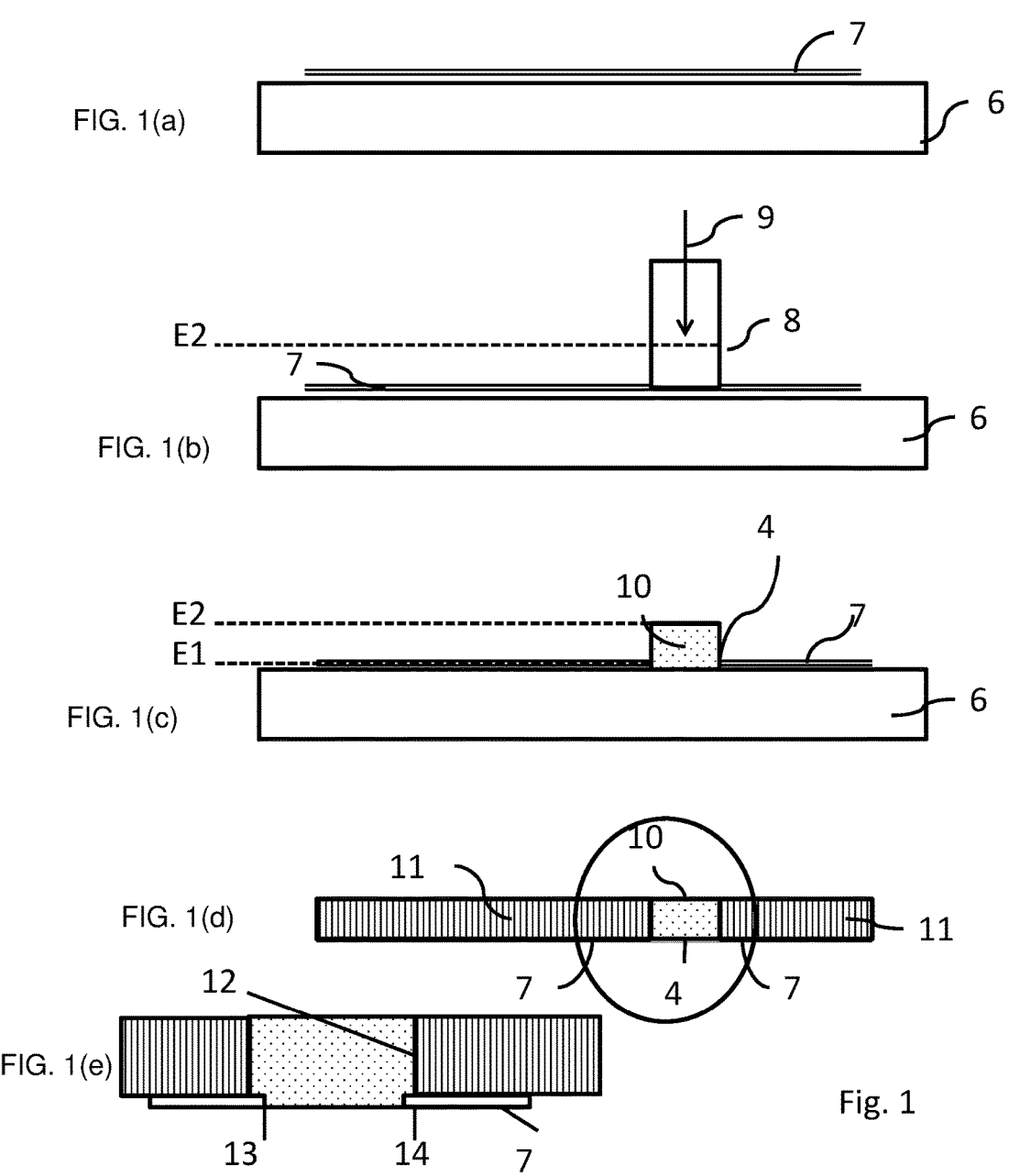

As illustrated in FIG. 1(b), in the next operational step, a die 8 is pressed onto the film 7 from spatially above. In terms of shape and size, the die 8 is adapted to the clearance 4 and by way of the periphery of said die 8 urges the periphery of the clearance 4 into the tool 6. The frame forms the periphery of the transparent region. As a result, the die 8 is intended to be the frame that represents a delimitation in the manufacture of the light-permeable region.

The die 8 is configured as a hollow space and assumes the role of a frame. An injector 9 is introduced into the interior of the die 8, and the region of the clearance is injected-moulded, using a first plastic material 10.

As illustrated in FIG. 1(c), thereafter, the die 8 is moved from the plane E1 of the film 7 and from the first plastic material 10 upwardly and away until said die 8 is located approximately on the plane E2 of the finished component. On account thereof, it is prevented that the second plastic material comes to lie along the plane E2, behind the light-permeable component.

Thereafter, the cavity around the first plastic material 10, above the film 7, is back injection-moulded and filled, using a second plastic material 11.

The second plastic material 11 here may completely wet the side walls 12 of the first plastic material 10 and the walls of the clearance of the film 13, and establish an optimal connection and a joint-free surface.

The resulting joint-free design configuration of the light-permeable region may be seen in the enlargement in FIG. 1(d).

As illustrated in FIG. 1(d), depending on the design embodiment, a step 14 is created between the sidewall 12 and the wall 13 of the film in that the light-permeable plastic material 10 is injected to just a few millimeters beyond the clearance.

In accordance with embodiments, the plastic material employed for the clearance is a light-permeable material. The light-permeable material here may be transparent in the visible region, such as is meaningful for a surround light. Above all, PMMA is employed here. However, it is also possible for a material which is transparent in the infrared range or in the ultraviolet range to be selected. The employment of these wavelength ranges for illuminating the surroundings of the vehicle is conceivable in conjunction with sensors.

Since materials which are transparent, particularly in the visible range, are often brittle, it is meaningful for the employment of the plastic material to be limited to the region of the clearance. The longitudinal cladding member per se is manufactured using a second plastic material which is more flexible than the light-permeable material and may be used in a more cost-effective manner.

Here, plastic materials such as ABS or PP may be employed. The use of the solution in accordance with embodiments is, however, not limited to these plastic materials.

Figure 2:
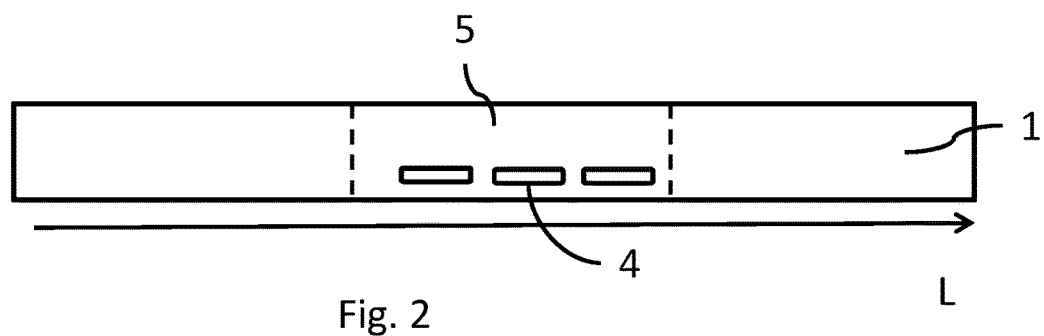
FIG. 2 illustrates a schematic illustration of a longitudinal cladding member, in accordance with embodiments.
Figure 3:
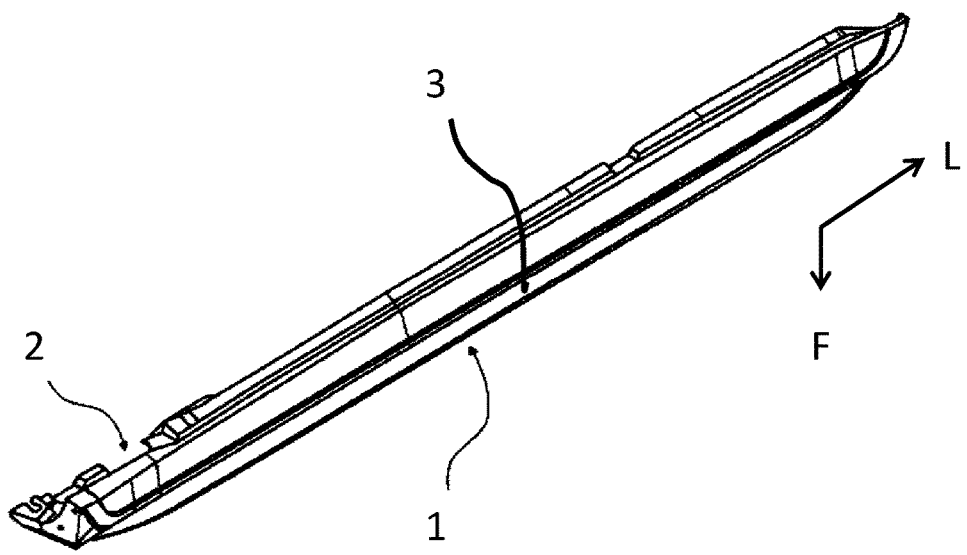
FIG. 3 illustrates an isomeric view of a longitudinal cladding member, in accordance with embodiments.

As illustrated in FIGS. 2 and 3, longitudinal cladding member 1 is provided in accordance with embodiments. The longitudinal cladding member 1 is divided into three regions, i.e. a first region, a central region 5, and an end region which extends in a direction of the rear of the vehicle.

A plurality of the light-permeable clearances 4 which are disposed in the central region 5 are illustrated in the example of FIG. 2. The front doors of the vehicle open in this region, so that the light-permeable clearances 4 illuminate the carriageway there so as to be convenient for the driver or occupant of the vehicle. Alternatively, the clearances 4 may also extend along the entire longitudinal axis L of the longitudinal cladding member 1.

A lower region 3 in which the light-permeable clearances 4 are located is illustrated in FIG. 3. The longitudinal cladding member 1 moreover has fastenings 2 by way of which the longitudinal cladding member 1 is attached to a longitudinal member of the vehicle.

Since the light-permeable clearances 4 are so close to the carriageway so as to efficiently illuminate the carriageway F in the surroundings of the vehicle, a lighting device which has a lower output, and are thus, able to be installed in a cost-effective manner are employable. The lighting device here is either adhesively bonded in a suitable manner or are fastened in another manner behind the light-permeable clearances 4. Since the longitudinal cladding member 1 is located in the region of heavy spray water, debris, and dirt ingress, it is, however, also meaningful for the lighting device to be integrated at the outset during injection-moulding.

To this end, the lighting device is laid up in the die 8, such that the lighting device by way of the injector 9 is insert-moulded.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Longitudinal cladding member
2 Fastenings
3 Lower sides
4 Light-permeable regions/clearances
5 Central region
6 Plastic injection-moulding tool
7 Film
8 Die
9 Injector
10 First plastic material
11 Second plastic material
12 Side wall
13 Wall
14 Step
E1, E2 Planes
F Carriageway

What is claimed is:

1. A method for manufacturing a longitudinal cladding member from a plastic material, the method comprising:
   on-demand punching of light-permeable regions from a film;
   arranging the film on a plastic injection-moulding tool;
   introducing and pressing a die onto the film and into a position of punchings;
   injection-moulding the punched-out regions of the film within the die, using a first plastic material;
   retracting the die; and
   filling and back injection-moulding a volume around the punched-out regions of the film, using a second plastic material.

2. The method of claim 1, wherein the film is formed in the plastic injection-moulding tool.

3. The method of claim 1, wherein retracting the die comprises retracting the relative to a plane of the plastic injection-moulding tool.

4. The method of claim 1, further comprising arranging lighting elements in the die.

5. The method of claim 1, wherein the first plastic material is dissimilar to the second plastic material.

6. The method of claim 1, wherein the second plastic material comprises polypropylene.

7. The method of claim 1, wherein the second plastic material comprises acrylonitrile butadiene styrene.

8. The method of claim 1, wherein the first plastic material comprises a light-permeable material.

* * * * *